H. GIBBS.
HOSE BAND TIGHTENER.
APPLICATION FILED FEB. 6, 1908.

1,034,100.

Patented July 30, 1912.

Witnesses:-
Inventor:-
Henry Gibbs
by Penn & Fisher
Attys:

UNITED STATES PATENT OFFICE.

HENRY GIBBS, OF CHICAGO, ILLINOIS, ASSIGNOR TO W. D. ALLEN MANUFACTURING COMPANY, OF CHICAGO, ILLINOIS, A CORPORATION.

HOSE-BAND TIGHTENER.

1,034,100.  Specification of Letters Patent.  Patented July 30, 1912.

Application filed February 6, 1908. Serial No. 414,529.

*To all whom it may concern:*

Be it known that I, HENRY GIBBS, a citizen of the United States, and a resident of Chicago, in the county of Cook and State of Illinois, have invented certain new and useful Improvements in Hose-Band Tighteners, of which I do declare the following to be a full, clear, and exact description, reference being had to the accompanying drawings, forming part of this specification.

The present invention has for its object to provide an improved device for tightening a hose band about the end of a hose for the purpose of securely holding the hose in engagement with a coupling inserted in the end thereof.

The invention consists in the features of novelty hereinafter described, illustrated in the accompanying drawing and more particularly pointed out in the claims at the end of this specification.

Figure 1:
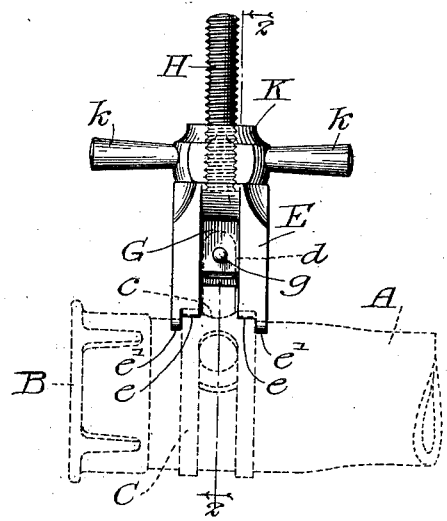
Figure 2:
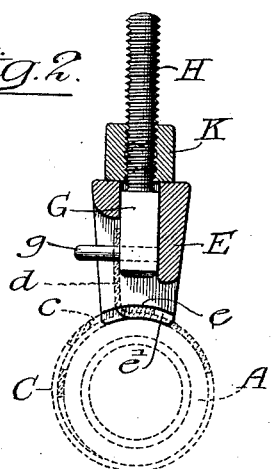
Figure 3:
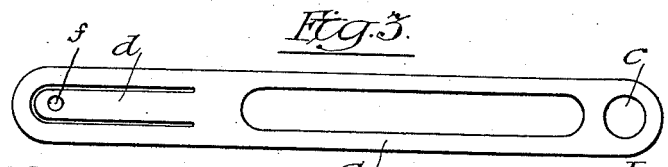

Figure 1 is a view in elevation of a hose band tightener embodying my invention, the hose band, a portion of the hose and a coupling being indicated in dotted lines. Fig. 2 is a view in vertical section on line 2—2 of Fig. 1. Fig. 3 is a plan view showing one form of hose band for use in connection with which my improved tightener is especially well adapted.

A designates one end of a section of rubber hose into which is inserted the shank of a coupling B, and C denotes the hose band whereby the hose A will be securely retained upon the coupling B. The band C for use in connection with which my improved band tightener is more especially adapted, is indicated by dotted lines in the several views of the drawings. As shown, this band C (which, however, forms no part of my present invention), has a hole $c$ at one end and a tongue $d$ formed integral therewith and projecting from a point adjacent the opposite end of the band.

When my improved tightener is to be used in applying a hose band of the kind illustrated, the band C will be placed about that part of the body A of the hose that extends over the shank or reduced portion of the coupling B with the ends of the band overlapping and with the tongue $d$ extending upwardly through the hole $c$ as indicated in dotted lines in Figs. 1 and 2.

My improved tightener comprises a body portion E that is chambered to receive a sliding head G that is carried by the screw H. From the head G projects a pin $g$ adapted to engage the end of the band to be tightened. A nut K having arms or wings $k$ engages the screw H. The nut K bears against the top of the body E and by turning the nut the screw H can be moved upward so as to cause the head G and its pin $g$ to draw upward the end of the hose band and thus tighten it around the hose. As shown, the lower portion of the body E has rounded or ovoid surfaces $e$ adapted to rest upon and fit the overlapped ends of the hose band C and I have also shown the lower part of the body E as provided with flanges $e'$ adapted to extend at each side of the hose band C to guard against all danger of the body E turning as the nut K is turned to tighten the band C, although these side flanges $e'$ are not essential.

From the foregoing description it will be seen that when a hose band C has been placed upon the hose A in the position indicated by Figs. 1 and 2 of the drawing, the pin $g$ will be passed through the hole $f$ in the tongue $d$ of the band, and, by turning the nut K the head G of the screw H will be moved upward, drawing with it the tongue $d$ of the hose band and firmly tighten the band about the hose. When the band has been sufficiently tightened, the screw K may be turned in reverse direction and the tightener may be then removed from the band.

Having thus described my invention, what I claim as new and desire to secure by Letters Patent, is:—

1. A hose band tightener comprising a body portion having a broad, concaved face at its inner end and said body portion having correspondingly curved flanges at the side edges of said face for engaging the side edges of the band, a longitudinally movable screw mounted in a guide-way in said body portion and held against rotation therein, said screw having a laterally projecting pin at its lower end for engaging the end of the band and a hand nut on said screw engaging the outer end of said body portion, substantially as described.

2. A hose band tightener comprising a body portion having a broad, cylindrically concaved face at its inner end adapted to rest upon the overlapping ends of the band and having correspondingly curved flanges at the side edges of said face for engaging the side edges of the band, said body portion having a chamber therein of angular cross-section open on one side, a longitudinally movable screw provided with a head corresponding in cross-section to said chamber and non-rotatably guided therein, a pin for engaging the end of the band fixed to said head and laterally projecting through the open side of said chamber, and a hand nut on said screw engaging the outer end of said body portion, substantially as described.

3. A hose band tightener comprising a body portion having a broad, cylindrically concaved, inner end adapted to rest upon the overlapping ends of the band and having a chamber therein of angular cross-section with an open slot at one side, said slot being closed at the upper end of said body portion, a longitudinally movable screw provided at its lower end with a head corresponding in cross-section to the chamber of said body portion and non-rotatably guided therein, a pin for engaging the end of the band fixed to said head and laterally projecting through said slot, and a hand nut on the upper threaded portion of said screw engaging the upper end of said body portion, said nut and pin being arranged to prevent the disengagement of said screw from said body portion, substantially as described.

HENRY GIBBS.

Witnesses:
CLARA A. NORTON,
KATHARINE GERLACH.

---

Copies of this patent may be obtained for five cents each, by addressing the "Commissioner of Patents, Washington, D. C."